March 7, 1939. R. W. CAMFIELD 2,149,507
METHOD FOR FORMING LAMINATED SHAPED ARTICLES
Filed Jan. 8, 1937
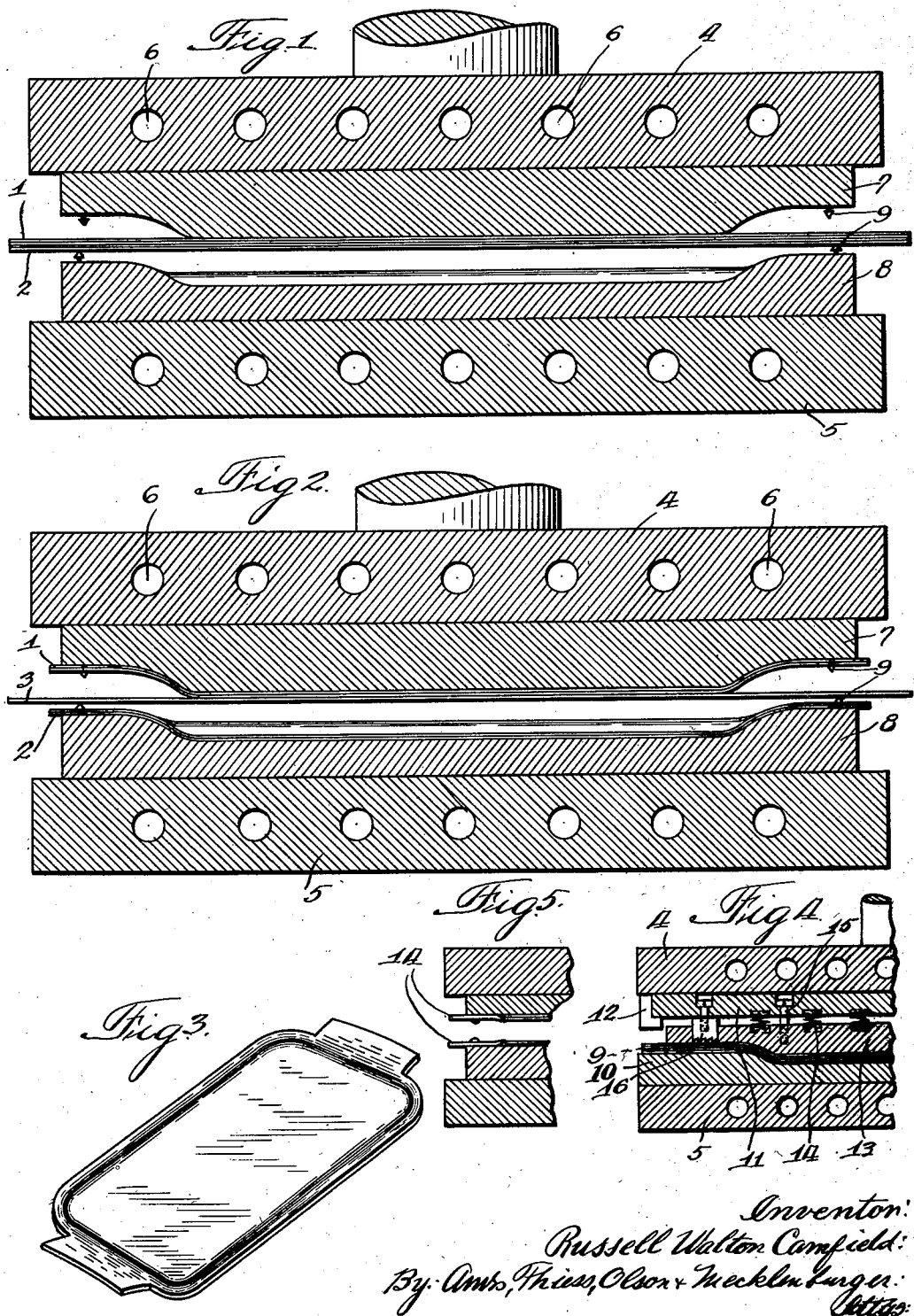
Inventor:
Russell Walton Camfield
By Ambs, Friess, Olson & Mecklenburger
Attys.

Patented Mar. 7, 1939

2,149,507

UNITED STATES PATENT OFFICE 2,149,507

METHOD FOR FORMING LAMINATED SHAPED ARTICLES

Russell Walton Camfield, Marion, Ind.

Application January 8, 1937, Serial No. 119,652

6 Claims. (Cl. 144—309)

This invention relates to the formation of laminated shaped articles and suitable apparatus therefor. More particularly, the present invention has reference to a method of forming laminated trays and other articles wherein at least some of the layers are given an initial shaping before the layers are secured together in final form.

In carrying out the present invention, layers or plies of wood or other suitable material are given a comparatively sharp bend during the fabrication of the trays or other articles. After some of the layers are shaped, they may be separated before being finally adhesively secured together. During this step, it is desirable to prevent any lateral displacement of the shaped layers so that when they are brought adjacent each other they will register exactly with each other and with the shaping dies. This is particularly important when one of the layers is provided with a grooved or embossed surface portion.

An object of this invention is to provide a method of forming laminated trays or other shaped articles without cracking or fracturing the wood or other material employed therein.

Another object is to provide such a method in which at least some of the individual layers may be given substantially the desired shape and then, after being separated, may be brought adjacent each other in substantially exact registration while a core inserted therebetween is shaped and adhesively secured thereto.

A further object is to provide a method as above set out, by means of which the laminated particles may be rapidly and efficiently formed at a minimum cost.

Still another object is to provide suitable apparatus for carrying out the methods covered by this invention.

Further objects and advantages will be apparent from the following description when considered with the accompanying drawing, in which latter—

Figure 1 is a central, longitudinal, cross-sectional view of a forming press with upper and lower surface layers positioned therein prior to being given an initial shape or form;

Fig. 2 is a view similar to Fig. 1, but showing the surface layers held adjacent the separated dies by securing means after being initially shaped and with a center layer or core positioned therebetween prior to the final pressing operation;

Fig. 3 is a perspective view of a completed tray;

Fig. 4 is a partial, transverse, cross-sectional view of a press fitted with embossing or design-forming dies in addition to the shaping dies, with the two surface layers being shaped therein; and Fig. 5 is a partial view of a press with shaping dies therein, illustrating a modified form of securing means for holding the shaped surface layers adjacent the dies when the latter are separated after initially shaping these layers.

While the present invention relates to the formation of various laminated, shaped articles, it will be particularly described in connection with the fabrication of trays. These are preferably made of a plurality of layers of any suitable wood, although other bendable, relatively stiff material may be employed. It has been found preferable to employ three layers,—a surface or top layer 1, a bottom layer 2, and a core 3. Each of the outer layers 1 and 2 may comprise one or more rather thin plies of wood. As shown in the drawing, there may be two plies in each surface layer adhesively secured together with the grain of one ply running transversely to the other. By employing a plurality of plies adhesively secured together in each of the surface layers, with the grain of the plies running transversely to that of the adjacent plies, the layers are strengthened and the possibility of warping and cracking is materially reduced. While the core 3 may also be formed with a plurality of plies similar to the surface layers, it has been found satisfactory to use merely a single ply which may, if desired, be thicker than the individual plies forming the surface layers.

The apparatus employed may comprise a single or multiple opening press having heated press platens 4 and 5. Steam may be supplied to the press platens through the channels 6 therein. Secured by any suitable means, such as clamps or bolts, to each pair of press platens 4 and 5 are forming or shaping dies 7 and 8. The steam supplied to the press platens is under sufficient pressure to heat the dies to a temperature of about 300° to 325° F., although the temperature may vary considerably beyond this range, being determined largely by the adhesive material employed. Obviously, any other suitable method for heating the press platens and dies may be employed.

The surface layers 1 and 2 are placed in the opened press, which is then closed to provide these two layers with substantially the shape of the finished tray, and the dies are properly shaped for this purpose. By inserting the two surface layers in the press for the initial shaping, they may be given a comparatively sharp bend without cracking or fracturing them. Adjacent the ends of the shaping dies, means, preferably offset on one die with respect to those on the other die, are provided for holding each of the surface layers substantially fixedly secured adjacent its respective die when the platens are subsequently separated after the initial forming or shaping step. As shown in Figs. 1 and 2, these may comprise pins 9, having a substantially spearhead-shaped end portion. When the dies are brought together with the two surface layers therein, the pins 9 on the upper die pass through the plies a distance sufficient to bring the spearhead partially or entirely through the upper layer which serves to secure this layer to its respective die. As the portions of the pins 9 which may extend beyond this surface layer are pointed or tapered they will be readily withdrawn from any but their adjacent layer when the dies are separated. The pins 9 on the bottom die pass through the lower layer 2 in the same manner. Thus, when the platens are separated, the upper layer will be substantially fixedly secured to the upper die and the lower layer to the lower die, thereby preventing any lateral displacement of either layer. If the press dies were again brought together, the two surface layers would register with each other and with their respective dies.

After the surface layers have been given an initial shape and the dies separated, the core 3 is positioned in the press between the two surface layers. A suitable heat-reactive adhesive, such as a synthetic resin, is provided on both the upper and lower surfaces of the core. One method of applying this adhesive is to wrap the core with a very thin fabric, such as tissue paper, saturated with the adhesive. Thereafter, the platens are again brought adjacent each other, thereby acting to shape the core similarly to the surface layers and also to set the adhesive and form the three layers as a single unit. The press platens are then separated and the tray disengaged from the securing members 9.

Following this, the edges, including the portion affected by the holding means 9, are removed and trimmed. The pins 9 are preferably so positioned that, when a tray is formed, the pins do not affect the handle or other projecting portions on the finished article. Thereafter, the tray may be finished in any suitable manner.

Referring to Fig. 4, there is shown a pair of platens 4 and 5 fitted not only with co-operating shaping dies but with one or more embossing dies for forming a design on or embossing the border on the tray surface. The press shown in this figure has a lower die 10 fixedly mounted on the lower platen as previously explained in connection with the press shown in Figs. 1 and 2. The upper die, however, is differently arranged. A plate 11 is fixedly mounted on the under surface of the upper platen 4 by means of clamps 12 or any other suitable means. The upper die 13 is then resiliently connected to the plate 11. For this purpose, coil springs 14 may be positioned between the plate 11 and the die 13 with the ends of the springs seated in recesses provided therefor in these members. In order to limit the movement of the die 13 away from the plate 11, bolts 15 are countersunk in the plate 11 and threaded into die 13. This permits limited movement of these two members. The portions of the upper die above those parts of the tray that are to be embossed are cut out and embossing dies 16 are positioned therein and fixedly mounted on the plate 11 so as to be capable of movement with respect to the die 13. The lower edges of the embossing dies are preferably arranged so that they do not extend downwardly quite as far as the lower edge of the shaping die 13 adjacent thereto. There may be one or more embossing dies 16 as desired.

In the utilization of the apparatus shown in Fig. 4, the two surface sheets 1 and 2 are positioned between the dies and the press is then closed. As the resiliently held upper shaping die 13 extends slightly below the embossing dies 16, the surface sheets are given an initial shape before the embossing dies engage the face of the upper surface sheet. Obviously the springs 11 must exert sufficient pressure to cause the shaping dies to shape the surface sheets before the embossing dies engage them. As the platens are then brought closer together, the embossing die is forced into the upper face of the upper surface sheet, thereby providing the desired design. Pins 9 or other securing means may also be provided in this type of apparatus and extend from the shaping dies near the outer edges thereof. Thus, as the two forming dies are separated, the surface layers are carried therewith so that, when they are again brought together, they will register properly with each other and the various dies.

Other types of securing means than the pins 9 may be employed. One such type is shown in Fig. 5. These comprise plates or clips 14, which are rotatably mounted adjacent the edges of the upper and lower dies. One or both ends preferably taper away from their respective dies. Thus, when the surface layers have been given their initial shape, the clips are rotated so that the ends of the clips mounted on the lower die engage the upper face of the lower surface layer, and the clips on the upper die engage the lower face of the upper surface layer. Consequently, when the two platens are separated, the surface layers are carried with their respective dies and are prevented from any lateral movement or displacement. Other means may also be employed to hold the surface layers adjacent the platens after these layers have been shaped.

Through the invention disclosed herein, trays and other laminated articles may be formed, with comparatively sharp bends, easily, efficiently, and in a minimum of time without cracking or splitting of the material employed therein and, if desired, the articles may be provided with designs in the same operation without requiring any additional time or steps.

While the present invention has been described in detail, various modifications and changes may be made therein without departing from this invention, and I therefore wish to be limited only by the prior art and the scope of the appended claims.

I claim:
1. The method of forming laminated, shaped articles which comprises simultaneously shaping layers of comparatively thin wood and embossing portions of one of said layers, separating said shaped layers while retaining the same against lateral displacement, inserting a wooden core and adhesive between said layers, and bringing said layers together while retaining the same against lateral displacement to shape the core similarly and cause said core and layers to be secured together in desired shape.

2. A method of forming laminated, shaped articles which comprises simultaneously shaping a plurality of layers of relatively stiff bendable material in superposed position, separating said layers while retaining the same against lateral displacement, inserting a core and adhesive therebetween, bringing said layers together while retaining the same against lateral displacement, and forcing them tightly against each other.

3. The method of forming laminated, shaped articles which comprises placing two separate layers of wood in contacting superposed position, simultaneously and similarly shaping said layers, separating said layers in a definite fixed path, inserting a substantially unshaped core and adhesive material between said layers, and bringing said layers together in said definite fixed path in substantially exact registration to similarly shape said core and cause the core and layers to be secured together in desired shape.

4. A method of forming laminated, shaped articles which comprises simultaneously shaping a plurality of layers of relatively stiff bendable material in superposed position, separating said layers, and adhesively securing substantially unshaped core material between and to said layers while similarly shaping said core material.

5. A method of forming laminated, shaped articles which comprises placing two separate layers of wood in contacting superposed position, simultaneously and similarly shaping said layers while applying heat thereto, separating said layers in a definite fixed path, inserting a core and heat reactive adhesive therebetween, supplying heat to said adhesive and bringing said layers together in said definite fixed path in substantially exact registration to cause the core and layers to be secured together in desired shape.

6. The method of forming laminated, die-shaped articles which comprises placing two layers of wood in superposed position, simultaneously and similarly shaping said layers, gripping each layer and while so gripped separating said layers in a definite fixed path, inserting core and adhesive material between said layers, and while still gripped bringing said shaped layers together in said definite fixed path in substantially exact registration to cause the core and layers to be secured together in desired shape.

RUSSELL WALTON CAMFIELD.